United States Patent [19]
Otis

[11] Patent Number: 6,085,241
[45] Date of Patent: Jul. 4, 2000

[54] INTERNET USER-BANDWIDTH MANAGEMENT AND CONTROL TOOL

[75] Inventor: Douglas A. Otis, Paso Robles, Calif.

[73] Assignee: Amplify. Net, Inc., Fremont, Calif.

[21] Appl. No.: 09/121,027

[22] Filed: Jul. 22, 1998

[51] Int. Cl.[7] .................................................. G06F 13/00
[52] U.S. Cl. .................... 709/223; 709/224; 709/232; 709/235; 370/232
[58] Field of Search ..................... 709/223, 224, 709/225, 226, 227, 229, 230, 232, 233, 235, 238, 250; 714/11, 47; 370/229, 230, 232, 234

[56] References Cited

U.S. PATENT DOCUMENTS

| | | | |
|---|---|---|---|
| 5,519,689 | 5/1996 | Kim | 370/232 |
| 5,812,525 | 9/1998 | Teraslinna | 370/229 |
| 5,828,737 | 10/1998 | Sawyer | 379/114 |
| 5,918,002 | 6/1999 | Klemets et al. | 455/7 |
| 6,021,120 | 2/2000 | Beyda et al. | 370/282 |

*Primary Examiner*—Viet D. Vu
*Attorney, Agent, or Firm*—Thomas E. Schatzel; Law Offices of Thomas E. Schatzel A Prof. Corp.

[57] ABSTRACT

A bandwidth manager for network segments comprises a pair of media access controllers connected by respective MII data interfaces to IEEE 802.3 physical layer transceivers. A data selector connected amongst the media access controllers and physical layer transceivers allows the transceivers to be cross connected at their media-independent data interfaces while the media access controllers are simply used to monitor the symbols being exchanged. The data selector also allows the media access controllers and physical layer transceivers to be connected in pairs with each pair able to control the data traffic in each direction between two network segments. In such mode, bandwidth usage statistics are computed packet-by-packet for each IP-address under management and bandwidth excesses are either mitigated or blocked completely.

15 Claims, 2 Drawing Sheets

INTERNET USER-BANDWIDTH MANAGEMENT AND CONTROL TOOL

BACKGROUND OF THE INVENTION

1. Field of the Invention

The invention relates generally to network bandwidth usage analysis, management and control, and more specifically to methods and circuits for measuring and/or limiting the real-time bandwidth usage of individual internet protocol addresses.

2. Description of the Prior Art

Internet access bandwidth is both a critical resource and a key cost factor for Internet service providers (ISP's) in particular. Reliable bandwidth usage auditing and monitoring is important in two types of web hostings offered by ISP's, i.e., "co-location" and "dedicated/shared-server" services.

In co-location service, a customer owns a dedicated web server located at an ISP's facility and purchases Internet bandwidth from the ISP. The ISP buys bandwidth in bulk and resells it to each customer. To do this best, accurate auditing and monitoring of the bandwidth usage by each web hosting customer is needed. ISP's without bandwidth usage tools charge for average bandwidth or peak usage.

In dedicated-server service, customers rent dedicated servers that are owned and maintained by the ISP. In shared-server service, customers rent disk space, and share CPU and ETHERNET bandwidth with other web site customers on the ISP's equipment. While this provides a low cost service for the customer, it frequently results in an overcrowding of the equipment and long delays or inaccessibility of the sites sharing the server. When the ISP has a clear picture of usage patterns, users can be relocated onto servers that do not clash with other users, or changed to dedicated-server service.

The web hosting business is becoming increasingly competitive. Customers are demanding guaranteed service and accountability for the access bandwidth charges by their ISP's. The customers too would welcome the ability to monitor their own usage patterns in real time. ISP's need to differentiate their services and provide a guaranteed quality of service to ensure customer satisfaction. In addition, unlike hit-rate data provided by other software, bandwidth usage patterns give web site owners a different angle for gauging responses to changes in content on their sites.

From a strategic standpoint, real-time bandwidth monitoring is important for the ISP's to determine if sufficient bandwidth is being purchased, to plan the growth of the network, and to analyze unusual bandwidth patterns which may signify problems with the server or the ISP's equipment.

A prior art pure-software approach to bandwidth management implements a priority-based queuing algorithm completely in UNIX or WINDOWS. These implementations usually have too much operating system overhead and its throughput rarely exceeds 1,000 Kb/s. A prior art pure hardware approach implements a control algorithm in logic. But only very simple algorithms are practical, such as packet counting and dropping when a bandwidth limit is reached. Such a simple-minded approach can drop too many packets unnecessarily, which results in massive re-transmission on the Internet. Instead of providing Quality of Service on the Internet/Intranet, it actually degrades the network. In the pure hardware approach, new features, such as an implementation of Internet Protocol version six (IPv6), generally require replacement of hardware equipment. A third prior art approach allows a bandwidth management device to change a customer's packets in order to slow down the sender. It creates a new variable in end-to-end TCP/IP flow control mechanism, and its effect on the Internet traffic is not well understood. The effectiveness of this depends on the implementation of hundreds of different TCP/IP stacks currently in use.

Internet access bandwidth is both a critical resource and a key cost factor for ISP's in particular. Reliable bandwidth usage auditing and monitoring is important in web hosting businesses. ISP's proactively allocate appropriate bandwidth among competing sources, and charge their customers according to their actual bandwidth usage. Real-time and historical bandwidth data is critical for planning the network growth.

SUMMARY OF THE PRESENT INVENTION

An object of the present invention is to provide a tool to monitor and control network-user bandwidth usage and costs.

Another object of the present invention is to provide a bandwidth manager that is transparent to the networks that it monitors and/or manages.

Briefly, a bandwidth manager embodiment of the present invention for network segments comprises a pair of media access controllers connected by respective MII data interfaces to IEEE 802.3 physical layer transceivers. A data selector connected amongst the media access controllers and physical layer transceivers allows the transceivers to be cross connected at their MII data interfaces while the media access controllers are simply used to monitor the symbols being exchanged. The data selector also allows the media access controllers and physical layer transceivers to be connected in pairs with each pair able to control the data traffic in each direction between two network segments. In such mode, bandwidth usage statistics are computed packet-by-packet for each IP-address under management and bandwidth excesses are either mitigated or blocked completely.

An advantage of the present invention is that a tool is provided for assessing the bandwidth demands and requirements of various users and applications on a network segment.

Another advantage of the present invention is that a tool is provided for limiting the bandwidth consumption of various users and applications on a network segment.

These and many other objects and advantages of the present invention will no doubt become obvious to those of ordinary skill in the art after having read the following detailed description of the preferred embodiments which are illustrated in the drawing figures.

IN THE DRAWINGS

FIG. 1 is a functional block diagram of a bandwidth manager embodiment of the present invention shown in a bandwidth policy monitoring mode; and FIG. 2 is a functional block diagram of a bandwidth manager embodiment of the present invention shown in a bandwidth management mode.

DETAILED DESCRIPTION OF THE PREFERRED EMBODIMENTS

Figure 1:
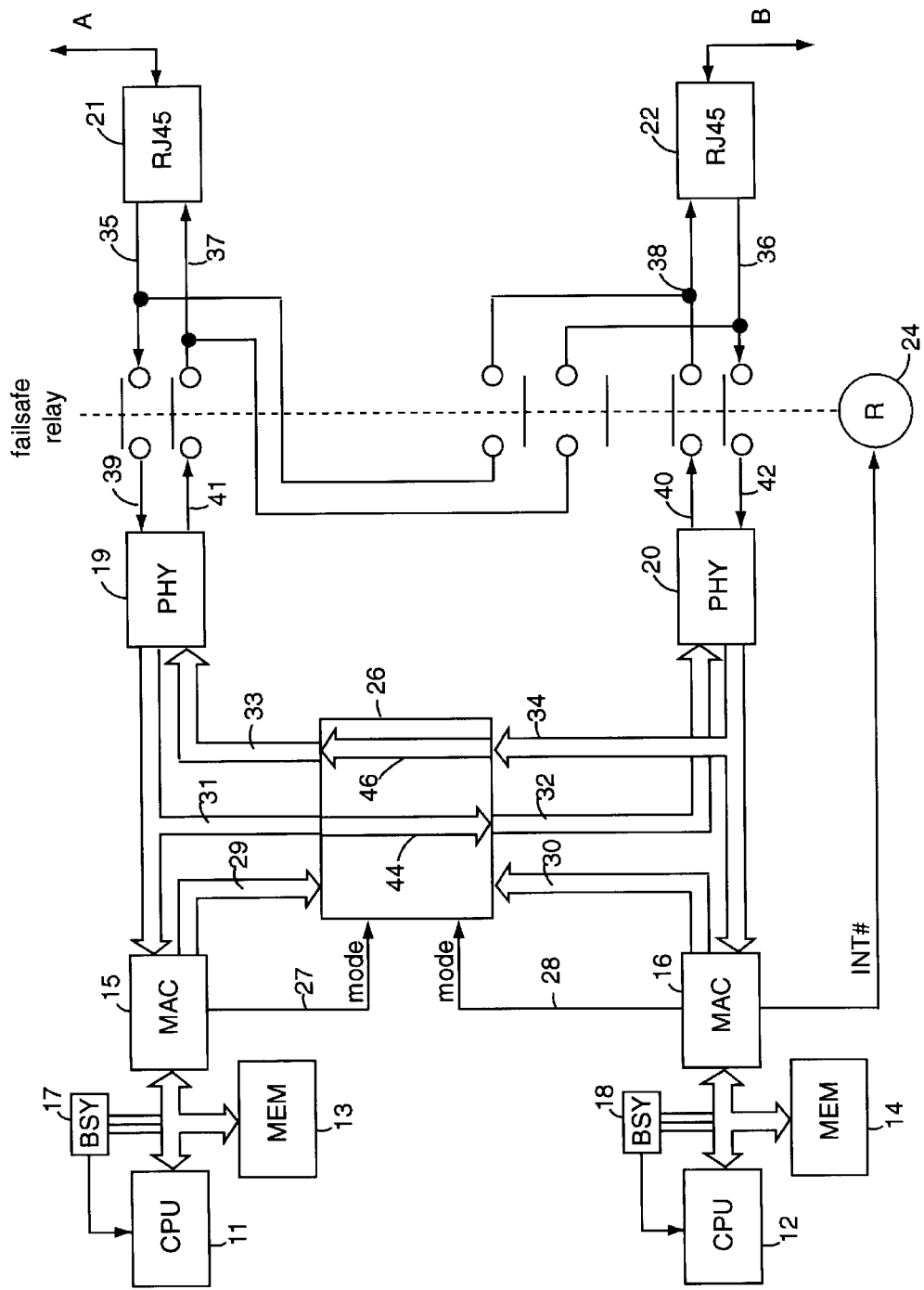

FIG. 1 illustrates a bandwidth manager embodiment of the present invention, referred to herein by the general reference numeral 10. The bandwidth manager 10 allows network managers to monitor and collect information on Intranet and/or Internet traffic bandwidth usage of different departments and different applications on an ETHERNET segment connected between a network "A" and a network "B". Such information is useful, e.g., for charge-back accounting by department, and in determining the available bandwidth for mission-critical applications. Internet Service Providers (ISP's) are also able to monitor the bandwidth usage of their web hosting customers for accounting purposes. In such an application the Internet would be represented by network "A" and the web hosts would be resident on network "B".

The bandwidth manager 10 comprises a pair of dedicated microcomputers (CPU) 11 and 12 that are respectively associated with a shared system memory 13 and 14. Each of these two subsystems is paired with a media access controller (MAC) 15 and 16. In one embodiment of the present invention, two separate peripheral component interface (PCI) buses were configured. The CPUs 11 and 12 were selected to be Intel Corporation (Santa Clara, CA) type i960RP embedded 32-bit reduced instruction set computers (RISC). The i960RP is an intelligent I/O processor that incorporates a complete PCI-based I/O subsystem including a direct memory access (DMA) controller, memory controller, I2C interface, "APIC" interface, and a PCI-to-PCI bridge. The MACs 15 and 16 were selected to be Digital Semiconductor (Maynard, Mass.) type 21143 PCI/Cardbus 10/100-Mb/s ETHERNET LAN Controllers.

The CpUs 11 and 12 are able to interrogate a PCI-bus busy (BSY) 17 and 18 detector logic that will report whether the PCI-bus is currently in use by the MAC 15 or 16, respectively. If the PCI-bus is not in use, then the CPU 11 or 12 can access memory 13 or 14 without hanging. Since there is an extensive use of cache memory within the Intel i960RP, quite a lot of useful jobs can be performed internally even though the PCI-bus and main memory are under control of the MAC. If the CPU 11 or 12 simply went out onto the PCI-bus without checking, it would hang until the PCI-bus master arbitration logic could return control after the MAC completes whatever operations it had in progress. In one embodiment of the present invention, standard PCI-bus control signals "S_FRAME#" and "S_IRDY#" were logically combined to generate a sideband CPU interrupt "SINT#4".

A pair of IEEE 802.3 physical layer devices (PHY) 19 and 20 provide all the physical layer functions of the IEEE 802.3 10BASE-T and 10BASE-TX from the media-independent interface (MII) to the isolation transformer of the 10/100-Mb/s magnetics module. Some of these functions are included in the Digital Semiconductor 21143 MAC but are not used in deference to the ICS1890. In one embodiment of the present invention, the PHYs 19 and 20 were chosen to be Integrated Circuit Systems' ICS1890 "PHYceiver". The ICS1890 integrates an MII 5-bit symbol interface for easy connection to Digital Semiconductor's MAC layer. The interface operates in IEEE standard MII mode for both 10BASE-T and 100BASE-TX. Autonegotiation logic is used to determine the capabilities of a remote partner, advertise its own capabilities to a remote link partner, and automatically adjust to the common operating mode with the best available performance.

Network "A" is interfaced via an RJ45 type modular connector 21. The interface to network "B" is via another RJ45 type modular connector 22. A relay 24 allows the RJ45 connections 21 and 22 to be cross-connected to one another, or full-duplex connected through to PHYs 19 and 20, respectively.

The purpose of relay 24 is to provide so-called "fail-safe" operation. A retriggerable timer is used to hold relay 24 on as long as system activity occurs. Such activity can be indirectly observed on the "INT#" output pins of the MAC 15 or 16. When power fails or CPU/MAC interactions die, relay 24 drops and directly interconnects RJ45s 21 and 22. For all intents and purposes, the bandwidth manager 10 is electrically absent and isolated from networks "A" and "B" and cannot interfere.

Figure 2:
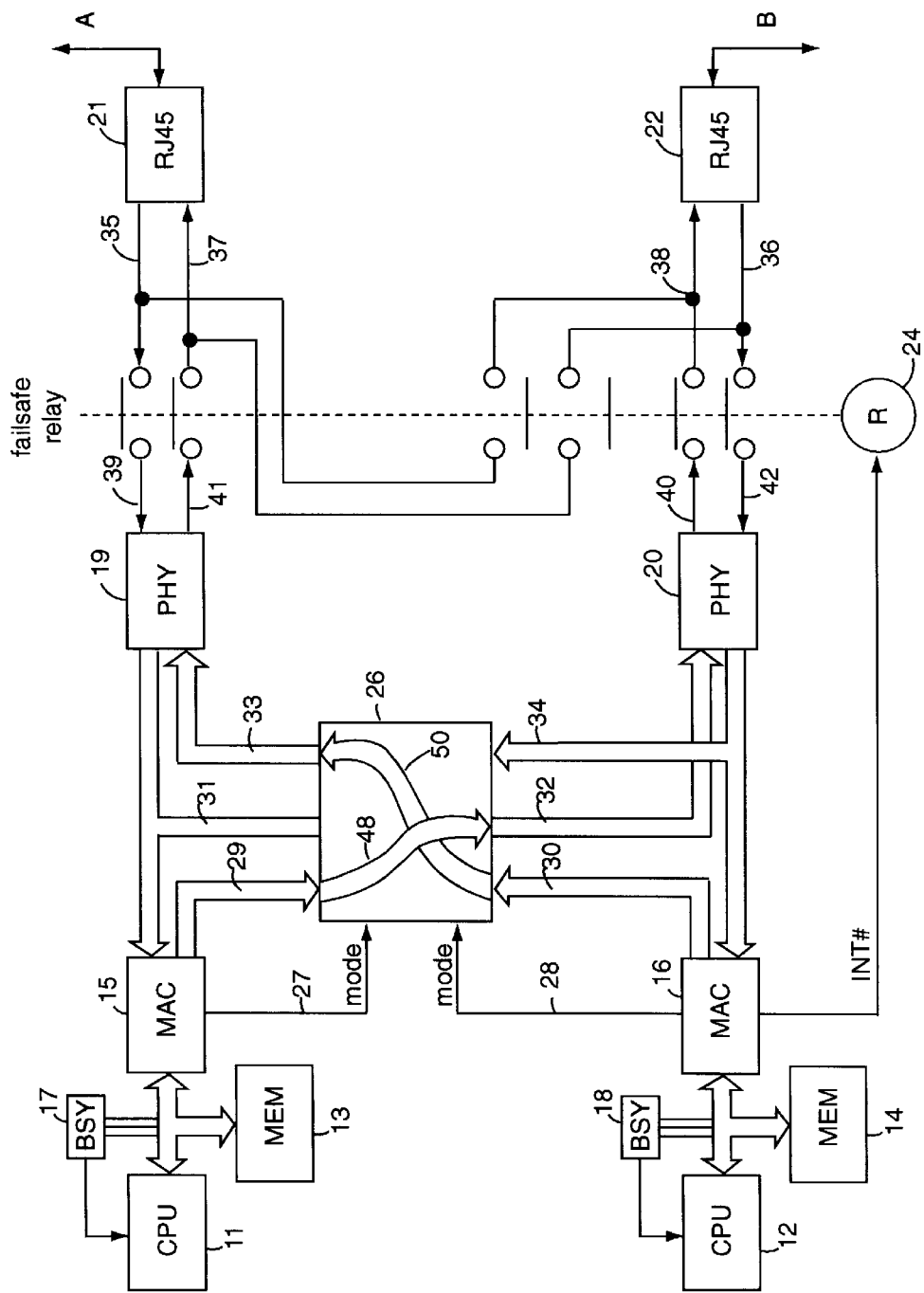

A programmable logic device (PLD) 26 is used to provide two operating modes. FIG. 1 shows a first of these two modes, "bandwidth policy monitoring," which is engaged by signals 27 and 28. FIG. 2 shows a second of these two modes, "bandwidth management," and is engaged by negated signals 27 and 28.

During bandwidth policy monitoring, the bandwidth manager 10 can be used to monitor "TCP/IP" traffic and provides real-time bandwidth usage data in various reports formatted in HTML. Preferably, such usage data can be accessed from any browser via the Internet. The traffic is monitored based on individual or group IP-addresses. TCP-based applications or application groups, such as HTTP, FTP, TELNET, SMTP or other Internet/Intranet applications can also be targeted and monitored. Such data can be accessed and imported into a corporate database or spreadsheet program for further analysis and charge-back. Mission-critical applications can be analyzed to see if they are receiving adequate bandwidth. Other reports can be used to see if the bandwidth capacity limits of a network are being approached.

For ISP's, the information is crucial to providing accounting for real-time bandwidth usage by a customer's Web site. Usually, ISP's who provide web hosting services use the number of bytes transferred in an hour, day or month as the basis for setting fees for this service. This is not a true picture of usage. The bandwidth manager 10 permits ISP's to monitor and provide clear reports on usage for accurate bandwidth charges. Customers can ensure that they are getting the bandwidth they are being charged for, and can detect bottlenecks in an ISP's network that limit available bandwidth for their site.

In the bandwidth policy monitoring mode, a pair of outputs 29 and 30 from MAC's 15 and 16 are not connected through by PLD 26. A receiver channel 31 from PHY 19 and originally from network "A" is connected through PLD 26 to a transmitter input 32 of PHY 20 for output on network "B". Similarly, a transmitter input 33 for PHY 19 outputs to network "A" and is connected through PLD 26 from receiver output 34 from PHY 20 and originated on network "B".

The specific interconnections between PHYs 19 and 20 and RJ45s 21 and 22 comprise a set of wires 35–42. Wire pairs 35 and 39, 37 and 41, 38 and 40, and 36 and 42, are connected to normally open relay contacts associated with relay 24. FIGS. 1 and 2 show such contacts in their energized positions, and so are shown closed. Wire pairs 35 and 38, and 37 and 36, are connected to normally closed relay contacts associated with relay 24. FIGS. 1 and 2 show such contacts in their energized positions, and so are shown open.

For bandwidth policy monitoring, the PLD 26 provides a data link 44 between channels 31 and 32, and further provides a link 46 between channels 33 and 34. The exchange that occurs between networks "A" and "B" is completely handled by PHYs 19 and 20 and so do not require any nursing by the MACs 15 and 16. However, the exchange between networks "A" and "B" over links 44 and 46 is done according to the MII data interface standards and is interpretable by the MACs 15 and 16 in a non-intrusive way. At high data rates this is very important because present hardware is exceedingly challenged to keep up in real-time with 100-Mb/s full-duplex data channels.

In such bandwidth policy monitoring mode, the PLD 26 must provide intermediate full-duplex nibble latching to guarantee that metastable states are not encountered during the synchronous data exchanges that each PHY 19 and 20 requires. This is because the PHYs 19 and 20 may not be synchronized to one another.

FIG. 2 shows how the bandwidth manager 10 can be used to limit bandwidth usage by different users and/or different TCP applications. The box representing PLD 26 in FIG. 2 is shown with a link 48 that interconnects the output of MAC 15 on channel 29 with the transmitter input channel 32 connected to PHY 20. MAC 15 therefore is in a position to work on data traffic moving from network "A" to "B". A,link 50 interconnects the output of MAC 16 on channel 30 with the transmitter input channel 33 connected to PHY 19. MAC 16 therefore is in a position to work on data traffic moving the opposite way from network "B" to "A".

It is critical to the present invention that a resource group comprising the CPU 11, MEM 13, and MAC 15 be solely dedicated to managing the data traffic moving from network "A" to "B" while at the same time providing that a second resource group comprising the CPU 12, MEM 14, and MAC 16 be solely dedicated to managing the data traffic moving from network "B" to "A". This is necessary because each resource group will be near maximally occupied with the acquisition and maintenance of user bandwidth statistics for each of as many as 20,000 IP-addresses under management.

As each IP-address under management sends or receives a data packet, the respective CPU 11 or 12 computes the running bandwidth demands for that address. A bandwidth limit value is associated with each IP-addresses under management. If the on-the-fly computation of the running bandwidth demand shows that the IP-address under management is operating within its allowed bandwidth, the data packet is simply allowed through. But if the on-the-fly computation of the running bandwidth demand shows that the IP-address under management is not operating within its allowed bandwidth, the data packet may be delayed for delivery at a less congested time or simply dropped altogether.

The data packet delay mechanism can be implemented with a circular ring buffer maintained in MEMs 13 and 14 that stores as much as two seconds worth of full-duplex data at the maximum rates. Incoming data to MACs 15 and 16 is spooled up to the buffers by DMA transfers. The CPUs 11 and 12 can then run statistics on the data in the spooled buffers and reorganize the data packet distribution so that each user will not exceed the authorized bandwidth. The buffers are then despooled back to the transmitter channel of the MACs 15 and 16 using DMA transfers over the PCI-buses from MEMs 13 and 14.

The bandwidth manager 10 therefore represents a real-time applications programming environment that will probably require a combination of assembly and high level programming for the operating programs of CPUs 11 and 12. The management of large ring buffers in the MEMs 13 and 14 will probably be best managed by an operating program that uses a large number of pointer registers.

The bandwidth manager 10 receives ETHERNET packets from either a server or a network and passes it on to the other. The real-time bandwidth usage of IP traffic of each of the IP-addresses specified is calculated and all non-IP traffic is ignored. The bandwidth is typically calculated as the number of bits sent or received per second.

ISP's, network managers, or other users can assign a maximum bandwidth to each individual IP-address or a group of IP-addresses. The group of addresses preferably do not have to be contiguous. The bandwidth manager 10 may track as many as 20,000 different IP-addresses that can be grouped in any manner at the ISP's discretion. A default bandwidth is assigned to all IP-addresses not specified.

Web-based bandwidth reporting software is preferably included to provide real-time traffic graphs of bandwidth usage in HTML format. For example, to allow viewing of individual real-time bandwidth usage via a browser from anywhere on the Internet.

In one embodiment of the present invention, such graphs are formatted into four types of usage. Daily usage is displayed in five minute averages. Weekly usage can be displayed in thirty minute averages. Monthly usage can be displayed in two hour averages. Annual usage can be displayed in daily averages. Such graphs are used to show real-time usage patterns and medium to long-term bandwidth consumption trends. They are useful in analyzing web site access patterns and planning bandwidth resource and network growth.

The bandwidth manager 10 alternatively allows users to burst above their allocated limit if the needed bandwidth is available. This feature is similar to an ATM service's variable bit-rate feature. Users may further be assigned a maximum burst rate along with a bandwidth allocation limit, and would be equivalent to constant bit-rate service in ATM systems.

The two ETHERNET network connections "A" and "B" can attach between a hub or a switch, or between an ETHERNET switching hub port and the ETHERNET segment of the web hosts. The relay 24 provides a fail-safe auto bypass feature to connect the two ETHERNET network connections "A" and "B" together in the case of a loss of power, or as a result of a hardware or software failure. When a Web site identified by its IP-address starts receiving too much data packet traffic, the bandwidth manager 10 buffers that traffic. If hits keep coming and the buffers fill up, data packets will be dropped.

Bandwidth control is implemented with packet byte tallies that are attributed to a customer based on packet content. As bandwidth is allocated per a service interval, a credit limited tally is used to account for bursts of packets coming in followed by intervals of no packets. Although the credit limit is adjusted to a specific amount of time, this time varies to insure very low bandwidth settings will still allow packets to be passed. Together with a short service interval, this credit tally integral provides a significant improvement, as seen by the server or client, in the delivery of packets. As the tallies are processed in sequence, the related packets become grouped within the ring buffer and are delivered together at a steady rate. This steady rate grouping greatly improves the performance of protocols that handle many simultaneous exchanges and attempts to discover the possible rates individually and dynamically as with most Internet protocols.

Although fixed bandwidth settings provide the most stable environment, it is desirable in some applications to allow the bandwidth settings to automatically adjust to take advantage of any remaining connection capacity. To accommodate this feature, a fast increase and slow decline with a fixed slew rate are used to consume available bandwidth. The slope of this slew establishes priority among the various customers. A faster increase or slower decline will increase the relative priority.

The bandwidth setting is reset to the guaranteed (lowest) level should the exchange become inactive. This timed reset feature allows some applications never to reduce the bandwidth once allocated by assigning a zero decline rate to improve the stability of the exchange protocol. The bandwidth is adjusted only after the exchange is completed during the timed activity.

Automatic control attempts to maintain a pre-set margin within the specified connection size. This control is done simultaneously using two techniques. The first technique controls the direction of the bandwidth slew; the second adjusts the overall maximum bandwidth for any one customer. Although each customer also has individual maximum settings, during times of inadequate margins, a universal top limit is reduced at a very slow slew rate. This second control method is also useful in applications using a zero decline slew for some customers.

A third method is sometimes employed to maintain high connection speed for most customers but to reduce the bandwidth of a customer that sustains a continuous high rate for a prolonged period of time. In systems that provide service to human users, intermittent high rate exchange is the typical use and to assure a perceived quality of service, customers with large transfers are scaled backed. This method employs a long term credit tally integral at a lower bandwidth limit than the normal customer rate bandwidth limit. Once this long term rate is reached, it becomes the dominate control. With this technique, a maximum duty percentage is enforced.

In applications other than bandwidth control, it is important to notify the system when uncontrolled bandwidth protocols or abuse are detected. This information is returned as dropped-packet counts which are ear-marked for particular customers. This helps protect upstream traffic where rejected packets can consume valuable resources and targeted upstream disconnection is desired.

Two processors can be used to provide independent time delays of individual packets passed between network interfaces to control of bandwidth utilization based on both static limits and dynamic statistical information collected. At any point in time, one of four control points are used that are a function of an integral of the difference between the allotted and actual bandwidth: a static maximum limit, an adjusted profile, a dynamic maximum limit that is a function of available margin, or a static limit based on a long term integral. The long and short term integrals are independently clamped to limit bandwidth credits.

In alternative embodiments of the present invention, two microcomputers can be used to automatically adjust a connection rate bandwidth to take advantage of any remaining connection capacity and to maintain a pre-determined margin within a pre-determined connection bandwidth size. Such microcomputers can automatically adjust the connection rate bandwidth by controlling the bandwidth-slew direction and by simultaneously adjusting an overall maximum bandwidth for any one particular connection. If a predetermined margin is inadequate, the allowable top limit for a connection rate can be slowly reduced over time and eventually lowered to a lowest level if inactive for a particular time. A new exchange must then occur to build up the connection rate bandwidth again.

A limiter may be used to control the maximum duty cycle that can be elicited by any one connection client. A statistic is integrated over a long term connection history for the connection client, and such statistic is then later used as a dominate control to limit bandwidth to the connection client.

The maximum bandwidth allocations of particular connections that maintain excessive connection bandwidths over prolonged periods must not be able to abuse the overall connection bandwidth of the system to the chagrin of other connections. So a device is desirable that can notify the system whenever any uncontrolled bandwidth protocols or abuse are detected. Such information is typically returned as a dropped-packet count. These are ear-marked for particular connections to protect a connection where rejected packets could otherwise consume valuable resources.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A network bandwidth management tool, comprising:
    a first and a second network interface "A" and "B" that provide for a connection of a group of network users to network;
    a first and a second physical layer interface transceiver respectively connected to the first and second network interfaces "A" and "B";
    a first and a second media access controller (MAC) respectively connected by media-independent interfaces (MII) to receive symbol information from the first and second physical layer interface transceivers;
    a cross-connection that patches through a receiver symbol output of the first physical layer interface transceiver to a transmitter symbol input of the second physical layer interface transceiver, and that patches through a receiver symbol output of the second physical layer interface transceiver to a transmitter symbol input of the first physical layer interface transceiver; and
    a first and a second microcomputer respectively connected to the first and second MACs and that provide for a computing of traffic bandwidth associated with individual network addresses related to said group of users, wherein said computing of traffic bandwidth is based on symbol information read by each of the first and second MACs from said MII interfaces.

2. The tool of claim 1, further comprising:
    a fail-safe mechanism providing for a direct interconnection of said group of network users to said network during an abnormal condition and for insertion of the tool via the first and second network interfaces "A" and "B" during a normal condition.

3. The tool of claim 2, wherein:
    said normal and abnormal conditions are derived from a processor interrupt signal associated with either of the first and second MACs.

4. The tool of claim 1, further comprising:
    a mode selector connected to disable the cross-connection and instead route said receiver symbol output of the first physical layer interface transceiver to a receiver symbol input of the first MAC, and route said receiver symbol output of the second physical layer interface transceiver to a receiver symbol input of the second MAC, and route said transmitter symbol input of the first physical layer interface transceiver to a transmitter symbol output of the second MAC, and route said transmitter symbol input of the second physical layer interface transceiver to a transmitter symbol output of the first MAC;

wherein data traffic moving from network interface "A" to "B" must be processed by the first MAC, and data traffic moving from network interface "B" to "A" must be processed by the second MAC.

5. The tool of claim 4, wherein:
the first and second microcomputers provide for a computing of traffic bandwidth statistics associated with individual network addresses related to said group of users, and said statistics are used on-the-fly to limit the rate at which individual data packets are passed between the network interfaces "A" and "B".

6. The tool of claim 5, wherein:
the first and second microcomputers provide independent time delays of individual packets to control bandwidth use based on static limits and dynamic-statistic information.

7. The tool of claim 5, wherein:
the first and second microcomputers provide for an independent time delay of individual data packets passed between the network interfaces "A" and "B" if a particular traffic bandwidth statistic associated with an individual network address indicates a rate limit would otherwise be exceeded.

8. The tool of claim 7, wherein:
the first and second microcomputers each maintain a ring buffer to spool and despool streams of data packets passed between the network interfaces "A" and "B".

9. The tool of claim 8, wherein:
the first and second microcomputers each include a mechanism to prevent hanging that would otherwise occur if the first or second MAC was currently acting as a bus master to control a main memory resource.

10. A network bandwidth manager, comprising:
a first and a second ETHERNET network interface "A" and "B" that provide for an internal protocol (IP) connection of a group of network users to network;
a first and a second physical layer interface transceiver respectively connected to the first and second network interfaces "A" and "B";
a first and a second media access controller (MAC) respectively connected by media-independent interfaces (MII) to receive symbol information from the first and second physical layer interface transceivers;
a cross-connection that patches through a receiver symbol output of the first physical layer interface transceiver to a transmitter symbol input of the second physical layer interface transceiver, and that patches through a receiver symbol output of the second physical layer interface transceiver to a transmitter symbol input of the first physical layer interface transceiver;
a first and a second microcomputer respectively connected to the first and second MACs and that provide for a computing of traffic bandwidth associated with individual network IP-addresses related to said group of users, wherein said computing of traffic bandwidth is based on symbol information read by each of the first and second MACs from said MII interfaces;
a fail-safe mechanism providing for a direct interconnection of said group of network users to said network during an abnormal condition and for insertion of the tool via the first and second network interfaces "A" and "B" during a normal condition, wherein, said normal and abnormal conditions are derived from a processor interrupt signal associated with either of the first and second MACs; and
a mode selector connected to disable the crossconnection and instead route said receiver symbol output of the first physical layer interface transceiver to a receiver symbol input of the first MAC, and route said receiver symbol output of the second physical layer interface transceiver to a receiver symbol input of the second MAC, and route said transmitter symbol input of the first physical layer interface transceiver to a transmitter symbol output of the second MAC, and route said transmitter symbol input of the second physical layer interface transceiver to a transmitter symbol output of the first MAC, wherein, data traffic moving from network interface "A" to "B" must be processed by the first MAC, and data traffic moving from network interface "B" to "A" must be processed by the second MAC.

11. The bandwidth manager of claim 10, wherein:
the first and second microcomputers compute traffic bandwidth statistics associated with individual network IP-addresses related to said group of users, and said statistics are used on-the-fly to limit the rate at which individual data packets can be passed between the network interfaces "A" and "B";
the first and second microcomputers provide for an independent time delay of individual data packets passed between the network interfaces "A" and "B" if a particular traffic bandwidth statistic associated with an individual network IP-address indicates a rate limit would otherwise be exceeded;
the first and second microcomputers each maintain a ring buffer to spool and despool streams of data packets passed between the network interfaces "A" and "B"; and
the first and second microcomputers each include a processor-interrupt mechanism to prevent hanging that would otherwise occur if the first or second MAC was currently acting as a bus master to control a mains memory resource when the first and second microcomputers attempted a main memory access.

12. The bandwidth manager of claim 11, wherein:
the first and second microcomputers automatically adjust a connection rate bandwidth to take advantage of any remaining connection capacity and maintain a pre-determined margin within a pre-determined connection bandwidth size.

13. The bandwidth manager of claim 12, wherein:
the first and second microcomputers automatically adjust said connection rate bandwidth by controlling a direction of bandwidth slew and simultaneously adjusting an overall maximum bandwidth for any one particular connection;
wherein, if said pre-determined margin is inadequate, an allowable top limit for said connection rate is slowly reduced over time and eventually lowers to a lowest level if inactive for a particular time, and such that a new exchange must build up said connection rate bandwidth again.

14. The bandwidth manager of claim 13, further comprising:
a limiter to control the maximum duty cycle that can be elicited by a connection client, wherein a statistic is integrated over a long term connection history for said connection client, and such statistic is later used as a dominate control to limit bandwidth to said connection client.

15. The bandwidth manager of claim 14, further comprising:
means for limiting maximum bandwidth allocations to particular connections that maintain an excessive connection bandwidth over a prolonged period such that a single connection cannot abuse the overall connection bandwidth of the system to the chagrin of other connections; and system notification means to notify the system when any uncontrolled bandwidth protocols or abuse are detected, wherein such information is returned as a dropped-packet count ear-marked for particular connections to protect a connection where rejected packets could otherwise consume valuable resources.

* * * * *